United States Patent
Lim et al.

(10) Patent No.: US 12,502,815 B2
(45) Date of Patent: Dec. 23, 2025

(54) TOP MOUNT ASSEMBLY AND METHOD FOR MANUFACTURING SAME

(71) Applicant: ILJIN Co., Ltd., Gyeongju-si (KR)

(72) Inventors: Young No Lim, Gyeongju-si (KR); Se Woong Jeong, Gyeongju-si (KR)

(73) Assignee: ILJIN Co., Ltd., Gyeongju-si (KR)

( * ) Notice: Subject to any disclaimer, the term of this patent is extended or adjusted under 35 U.S.C. 154(b) by 560 days.

(21) Appl. No.: 17/021,625

(22) Filed: Sep. 15, 2020

(65) Prior Publication Data

US 2020/0406515 A1 Dec. 31, 2020

Related U.S. Application Data

(63) Continuation of application No. PCT/KR2019/003066, filed on Mar. 15, 2019.

(30) Foreign Application Priority Data

Mar. 15, 2018 (KR) .................. 10-2018-0030494

(51) Int. Cl.
*B29C 45/14* (2006.01)
*B60G 15/04* (2006.01)
(Continued)

(52) U.S. Cl.
CPC ........ *B29C 45/14008* (2013.01); *B29C 45/14* (2013.01); *B60G 15/04* (2013.01);
(Continued)

(58) Field of Classification Search
CPC .............. B29C 45/14008; B60G 15/04; B60G 15/068; B60G 2202/31; B60G 2204/128; B60G 15/067; F16F 1/126
See application file for complete search history.

(56) References Cited

U.S. PATENT DOCUMENTS 5,476,326 A * 12/1995 Ueno ................... B60G 15/067
384/144
11,951,788 B2 * 4/2024 Hilbinger ............. B60G 15/068
(Continued)

FOREIGN PATENT DOCUMENTS

JP 10122293 A * 5/1998
JP H10122293 A 5/1998
(Continued)

OTHER PUBLICATIONS

Machine Translation of JP2007218312 (Year: 2007).*
(Continued)

*Primary Examiner* — Timothy Wilhelm
(74) *Attorney, Agent, or Firm* — Dinsmore & Shohl LLP; Yongsok Choi, Esq.

(57) ABSTRACT

A top mount assembly includes an upper plate having a first bushing accommodation portion formed to protrude upward at a center portion; a lower plate disposed below the upper plate and having a second bushing accommodation portion formed to protrude downward at a center portion; a rubber bushing accommodated in an accommodation space defined by the first bushing accommodation portion and the second bushing accommodation portion when the upper plate and the lower plate are coupled to each other; a plurality of bolts coupled to the lower plate and the upper plate so as to protrude upward from the upper plate; an upper housing integrally coupled to the lower plate and the plurality of bolts below the lower plate by an insert injection molding; a lower housing coupled to the upper housing from below the upper housing; and a bearing interposed between the upper housing and the lower housing.

11 Claims, 12 Drawing Sheets

(51) Int. Cl.
*B60G 15/06* (2006.01)
*F16C 19/10* (2006.01)
*F16C 27/06* (2006.01)

(52) U.S. Cl.
CPC ............ *B60G 15/068* (2013.01); *F16C 19/10* (2013.01); *F16C 27/066* (2013.01); *B60G 2202/31* (2013.01); *B60G 2204/128* (2013.01); *B60G 2204/41* (2013.01); *B60G 2204/418* (2013.01); *B60G 2204/43* (2013.01); *B60G 2206/722* (2013.01); *B60G 2206/73* (2013.01); *B60G 2206/81012* (2013.01); *B60G 2206/8207* (2013.01); *B60G 2206/82092* (2013.01); *F16C 2326/05* (2013.01)

(56) References Cited

U.S. PATENT DOCUMENTS

| | | | | |
|---|---|---|---|---|
| 2002/0171222 | A1* | 11/2002 | Tadano | B60G 15/067 280/124.155 |
| 2008/0031562 | A1* | 2/2008 | Poulle | B60G 11/15 384/618 |
| 2010/0040317 | A1* | 2/2010 | Kellam | B60G 15/068 384/482 |
| 2012/0049428 | A1* | 3/2012 | Moore | F16F 13/14 267/220 |
| 2012/0292149 | A1* | 11/2012 | Matsumura | F16F 9/54 188/321.11 |
| 2016/0221409 | A1* | 8/2016 | Jang | F16C 35/067 |
| 2016/0223023 | A1* | 8/2016 | Lee | F16C 19/163 |
| 2017/0368899 | A1* | 12/2017 | Hamada | F16F 9/54 |
| 2022/0080798 | A1* | 3/2022 | Song | B29C 65/606 |

FOREIGN PATENT DOCUMENTS

| | | | | |
|---|---|---|---|---|
| JP | 2001140964 | A | * | 5/2001 |
| JP | 2002081503 | A | * | 3/2002 |
| JP | 2002137618 | A | | 5/2002 |
| JP | 3695153 | B2 | * | 9/2005 |
| JP | 2007218312 | A | * | 8/2007 |
| JP | 2008051193 | A | * | 3/2008 |
| JP | 4963401 | B2 | * | 6/2012 |
| JP | 2020118248 | A | * | 8/2020 |
| KR | 100917557 | B1 | | 9/2009 |
| KR | 20110094938 | A | * | 8/2011 |
| KR | 20150068525 | A | * | 6/2015 |
| WO | WO-8905242 | A1 | * | 6/1989 |
| WO | WO-0230694 | A1 | * | 4/2002 ........... B60G 13/003 |

OTHER PUBLICATIONS

Machine Translation of JPH10122293 (Year: 1998).*
Machine Translation of JP4963401 (Year: 2012).*
International Search Report of PCT/KR2019/003066 dated Jun. 24, 2019.

* cited by examiner

TOP MOUNT ASSEMBLY AND METHOD FOR MANUFACTURING SAME

CROSS-REFERENCE TO RELATED APPLICATION

This application is a continuation of International Application No. PCT/KR2019/003066 filed on Mar. 15, 2019 claiming priority to Korean Patent Application No. 10-2018-0030494 filed on Mar. 15, 2018, the entire contents of which are herein incorporated by reference.

TECHNICAL FIELD

The present disclosure relates to a top mount assembly and a manufacturing method thereof. The present disclosure has been derived from a study conducted as Carbon Industry Foundation Development Project of Korea Evaluation Institute of Industrial Technology of Ministry of Trade, Industry and Energy [Project Number: 10083624, Research Subject Name: Development of vehicle suspension module using rapid curing carbon composite material high speed molding technology.

BACKGROUND

A suspension system of a vehicle is a system which supports a weight of a vehicle body, reduces a vertical vibration of a wheel to improve ride comfort, prevents damage to a cargo due to an impact, and prevents an excessive load from acting on each part. A front suspension system of an individual suspension type includes a wishbone-type suspension system and a McPherson-type suspension system. The McPherson-type suspension system has been widely used in passenger cars due to a simplified structure and low cost as compared to the wishbone-type suspension system.

In the McPherson-type suspension system, a strut having a shock absorber embedded therein and a coil spring provided outside is used. An upper end of the strut is coupled to the vehicle body through a top mount assembly and a lower end thereof is coupled to a knuckle. The strut is configured to be rotated relative to the vehicle body according to steering of the wheel. The top mount assembly comprises an insulator and a strut bearing fitted into the insulator. The insulator comprises an upper plate, a lower plate, and a rubber bushing disposed between the upper plate and the lower plate. The strut bearing comprises an upper housing, a lower housing which is rotated relative to the upper housing, and a bearing disposed between the upper housing and the lower housing. Further, the strut bearing comprises seal members installed radially inward and outward of the strut bearing between the upper housing and the lower housing so as to prevent foreign substances such as dust or water from being inflowed into the bearing.

The conventional top mount assembly is configured such that the strut bearing is fitted to the insulator. Thus, foreign substances may flow between the upper housing of the strut bearing and the insulator. Due to the foreign substances flowing between the upper housing and the insulator, the insulator and the strut bearing may be spaced apart from each other, and the insulator or the strut bearing may be damaged.

SUMMARY

Technical Problem

Various embodiments of the present disclosure provide a top mount assembly in which an upper housing is configured to be integrally coupled to a lower plate and a plurality of bolts, and a manufacturing method for the top mount assembly.

Technical Solution

According to one aspect of the present disclosure, there is provided a top mount assembly. The top mount assembly according to one embodiment comprises: an upper plate having a first bushing accommodation portion formed to protrude upward at a center portion; a lower plate disposed below the upper plate and having a second bushing accommodation portion formed to protrude downward at a center portion; a rubber bushing accommodated in an accommodation space defined by the first bushing accommodation portion and the second bushing accommodation portion when the upper plate and the lower plate are coupled to each other; a plurality of bolts coupled to the lower plate and the upper plate so as to protrude upward from the upper plate; an upper housing integrally coupled to the lower plate and the plurality of bolts below the lower plate by an insert injection molding; a lower housing coupled to the upper housing from below the upper housing; and a bearing interposed between the upper housing and the lower housing such that the lower housing is rotated relative to the upper housing.

In one embodiment, the lower plate may comprise a plurality of holding portions formed to be arranged at regular intervals along a circumferential direction of the second bushing accommodation portion.

In one embodiment, the holding portion may comprise a protrusion formed to protrude downward from the lower plate toward the lower housing, and an opening may be formed in a lower end of the protrusion.

In one embodiment, the upper housing may comprise a coupling portion that covers the protrusion and a filling portion provided to be filled from the opening to an upper surface of the lower plate.

In one embodiment, the plurality of bolts may be coupled to the lower plate by being press-fitted to the lower plate from below the lower plate, and the upper plate may be press-fitted to the plurality of bolts which are press-fitted to the lower plate.

In one embodiment, the upper housing may be integrally coupled to the lower plate and the plurality of bolts by the insert injection molding in a state in which the plurality of bolts are fitted to the lower plate.

In one embodiment, the bolt may comprise a head portion disposed below the lower plate, a fitting portion fitted to the lower plate and the upper plate, and a threaded portion protruding upward from the upper plate.

In one embodiment, a diameter of the fitting portion may be larger than a diameter of the threaded portion.

In one embodiment, a plurality of jig insertion openings, into which a jig configured to support the head portion of the bolt is inserted, may be formed in a lower portion of the upper housing.

In one embodiment, a diameter of the jig insertion opening may be smaller than a diameter of the head portion.

In one embodiment, the upper housing may comprise a plate mount portion having an upper surface to which the lower plate is mounted; and a rib portion having a plurality of ribs disposed around the plate mount portion.

In one embodiment, the plurality of ribs may be radially arranged about the plate mount portion.

In one embodiment, a plurality of concave portions, which are arranged to be spaced-apart from each other along a circumferential direction, may be formed in a lower surface of the upper housing.

According to one aspect of the present disclosure, there is provided a method of manufacturing a top mount assembly. The method may comprise: manufacturing a lower plate having a bushing accommodation portion formed to protrude downward at a center portion thereof; coupling a plurality of bolts to the lower plate so as to protrude upward from the lower plate; manufacturing an upper housing by an insert injection molding to be integrally coupled to the lower plate and the plurality of bolts from below the lower plate; disposing a rubber bushing in the bushing accommodation portion of the lower plate; coupling an upper plate to the plurality of bolts such that the upper plate is disposed above the lower plate and the rubber bushing is accommodated by the upper plate; manufacturing a lower housing configured to be coupled to the upper housing; disposing a bearing above the lower housing; and coupling the lower housing to a lower side of the upper housing such that the bearing is interposed between the upper housing and the lower housing.

In one embodiment, in the manufacturing of the lower plate, a plurality of holding portions arranged at regular intervals along a circumferential direction of the bushing accommodation portion may be formed in the lower plate.

In one embodiment, in the manufacturing of the lower plate, a protrusion protruding downward from the lower plate toward the lower housing may be formed in the holding portion, and an opening may be formed in a lower end of the protrusion.

In one embodiment, in the manufacturing of the upper housing, a coupling portion configured to cover the protrusion and a filling portion filled from the opening to an upper surface of the upper plate may be formed in the upper housing.

In one embodiment, in the coupling of the plurality of bolts to the lower plate, the plurality of bolts may be press-fitted to the lower plate from below the lower plate such that the plurality of bolts are coupled to the lower plate.

In one embodiment, in the coupling of the upper plate to the plurality of bolts, the upper plate may be press-fitted to the plurality of bolts from above the lower plate such that the upper plate is coupled to the plurality of bolts.

In one embodiment, the coupling of the upper plate to the plurality of bolts may comprise disposing a jig to support the plurality of bolts from below the upper housing, and press-fitting the upper plate to the plurality of bolts.

Advantageous Effects

According to a top mount assembly and a manufacturing method thereof in various embodiments of the present disclosure, an upper housing is integrally coupled to a lower plate and a plurality of bolts from below the lower plate by an insert injection molding. Thus, it is possible to prevent foreign substances from entering between the lower plate and the upper housing. Accordingly, it is possible to prevent the lower plate and the upper housing from being spaced apart from each other. In addition, it is possible to prevent the lower plate or the upper housing from being damaged.

EXPLANATION OF REFERENCE NUMERALS

Figure 1:
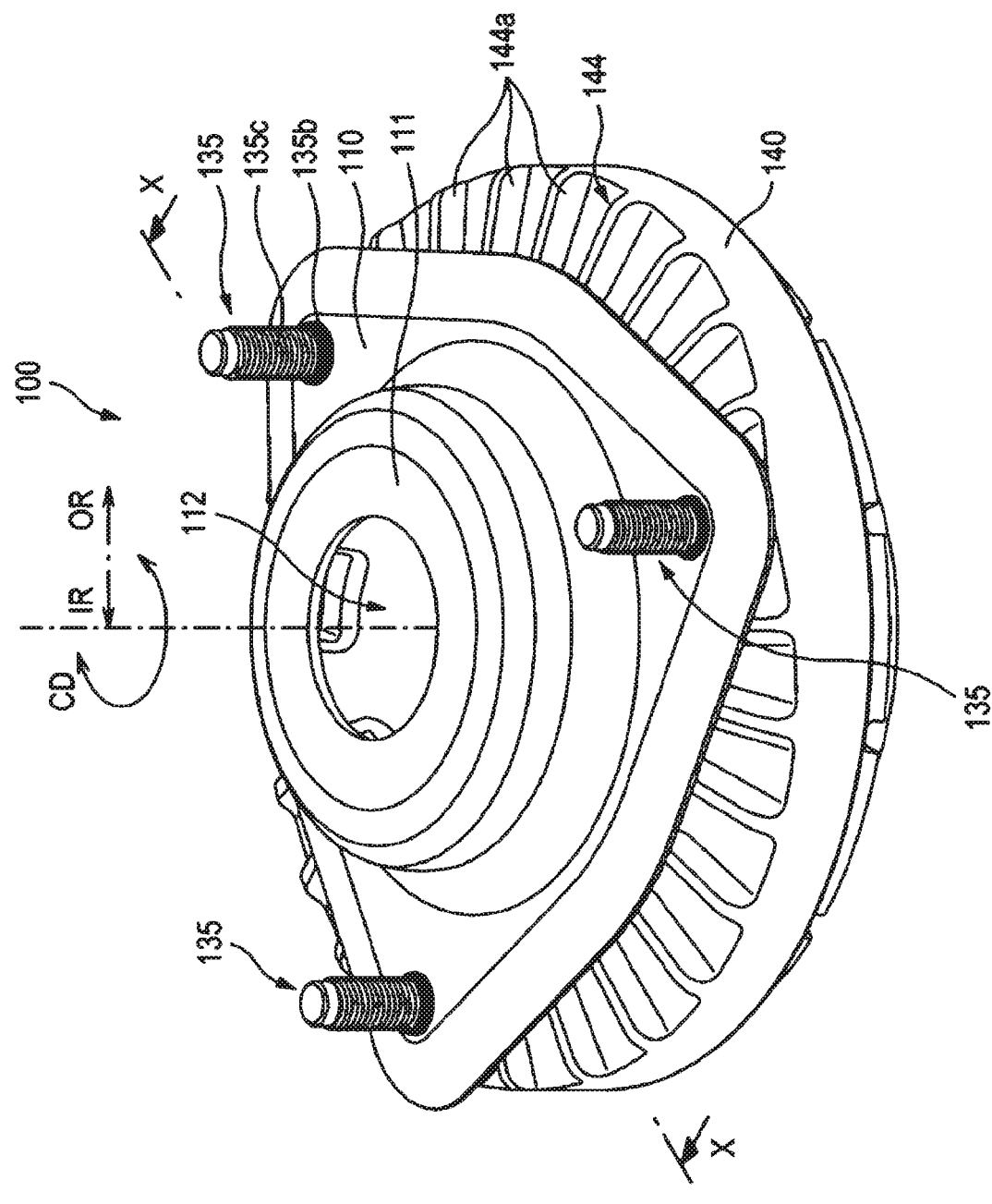
FIG. 1 is a perspective view showing a top mount assembly according to one embodiment of the present disclosure.

50: strut, 51: strut bolt, 52: strut nut, 60: spring, 100: top mount assembly, 110: upper plate, 111: first bushing accommodation portion, 112: first central opening, 113: first bolt coupling hole, 120: lower plate, 121: second bushing accommodation portion, 122: second central opening, 123: second bolt coupling hole, 124: first holding portion, 124a: first protrusion, 124b: first opening, 130: rubber bushing, 131: first projection, 132: second projection, 133: core member, 133a: opening, 135: a plurality of bolts, 135a: head portion, 135b: fitting portion, 135c: threaded portion, 140: upper housing, 141: first coupling portion, 142: first filling portion, 143: plate mount portion, 144: rib portion, 144a: rib, 145: jig insertion opening, 146: concave portion, 147: extended portion, 148: upper hook, 149: groove, 149a: inner sidewall, 149b: bottom wall, 150: lower housing, 151: lower hook, 152: bearing seat, 153: upper end portion, 153a: inner peripheral surface, 154: second coupling portion, 155: second filling portion, 160: bearing, 161: inner ring, 162: outer ring, 163: retainer, 164: rolling element, 170: inner seal member, 171: seal frame, 171a: sleeve, 171b: flange, 172: seal base portion, 173: seal rib, 180: spring pad frame, 181: second holding portion, 181a: second protrusion, 181b: second opening, 190: spring pad, 191: seat portion, 192: outer seal rib

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising." "including," "having." and the like used herein should be construed as open-ended terms encompassing the possibility of including other embodiments.

The singular form described herein may include the plural form unless the context clearly indicates otherwise, and this is equally applied to the singular form set forth in the claims.

Directional directives such as "upward," "above," "upper side," and the like used herein are based on a direction in which an upper plate is located with respect to a lower plate in the accompanying drawings, and directional directives "downward," "below," "lower side," and the like mean a direction opposite the direction of the direction indicating terms such as "upward," "above," "upper side." and the like. The upper plate and the lower plate shown in the accompanying drawings may be oriented differently, and the direction indicating terms may be construed accordingly. A directional directive of a "radially outward direction" used herein means a direction away from a rotational axis in a radial direction with respect to the rotational axis of a rotating body, and a directional directive of a "radially inward direction" means a direction opposite the radially outward direction.

Hereinafter, embodiments of the present disclosure will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though a description of a component is omitted, such a component is not intended to be excluded in any embodiment.

Figure 2:
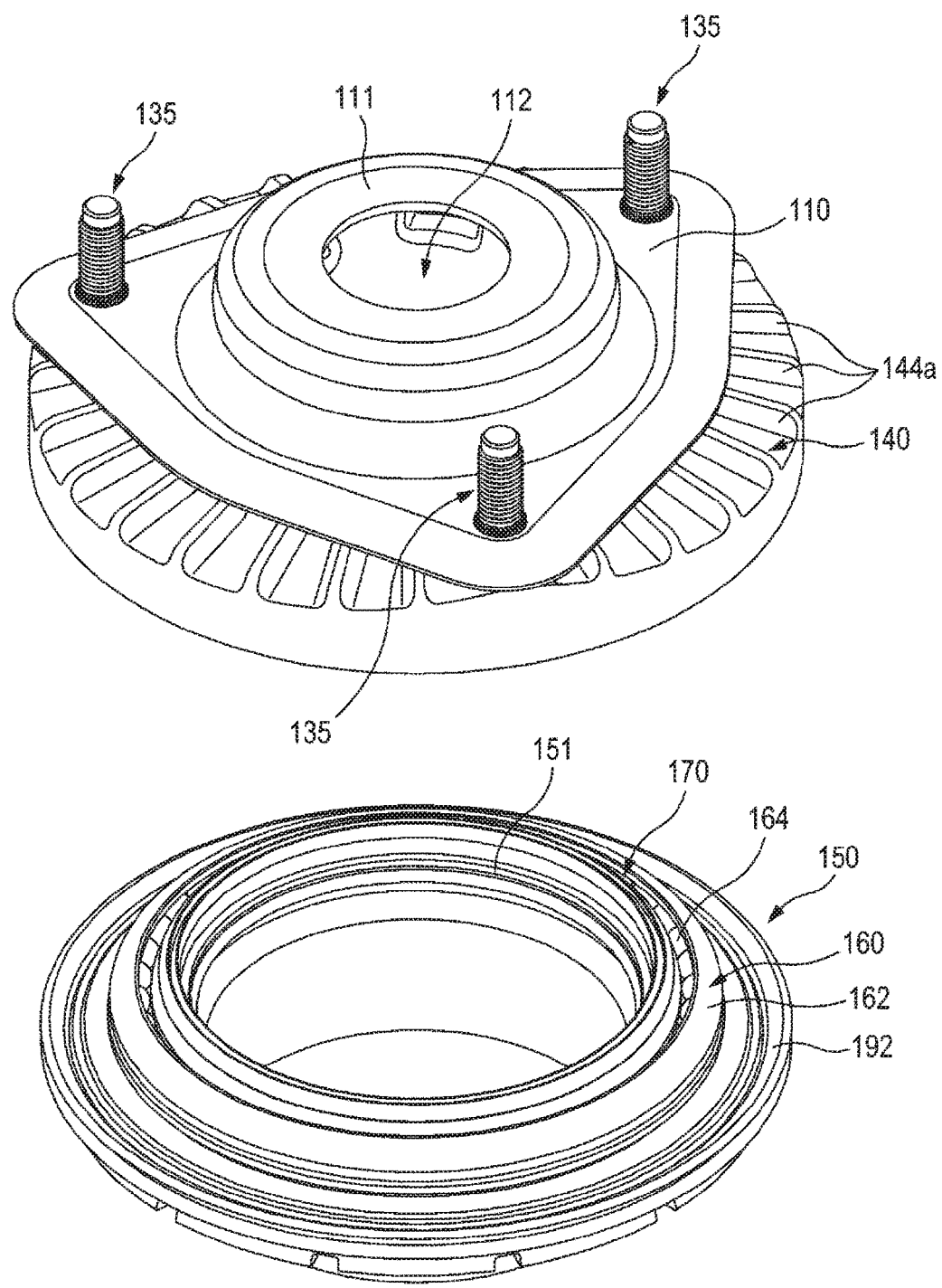
FIG. 2 is an exploded perspective view illustrating the top mount assembly shown in FIG. 1.
Figure 3:
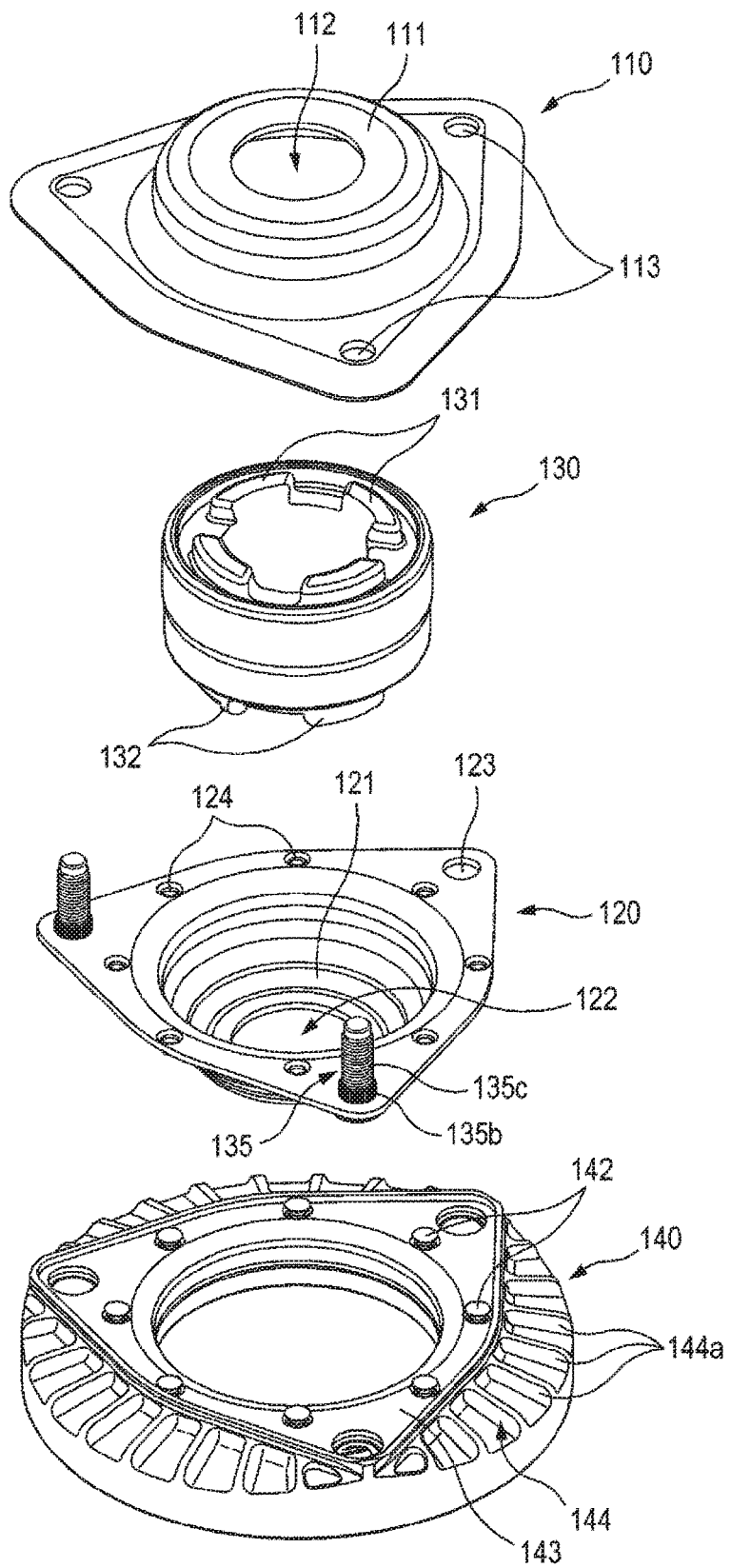
FIG. 3 is an exploded perspective view illustrating a configuration in which an insulator and an upper housing shown in FIG. 2 are disassembled.

FIG. 1 is a perspective view showing a top mount assembly according to an embodiment of the present disclosure. FIG. 2 is an exploded perspective view illustrating the top mount assembly shown in FIG. 1. FIG. 3 is an exploded perspective view illustrating a configuration in which an insulator and an upper housing shown in FIG. 2 are disassembled.

As shown in FIGS. 1 to 3, a top mount assembly 100 according to an embodiment of the present disclosure comprises an upper plate 110, a lower plate 120, a rubber bushing 130, a plurality of bolts 135, an upper housing 140, a lower housing 150, and a bearing 160. The top mount assembly 100 is coupled to an upper end of the strut 50 and serves to reduce the transfer of impact or vibration between the strut 50 and a vehicle body. The upper plate 110, the lower plate 120 and the rubber bushing 130 may be components of an insulator. The upper housing 140, the lower housing 150 and the bearing 160 may be components of a strut bearing.

As shown in FIG. 3, the upper plate 110 has a first bushing accommodation portion 111 that protrudes upwardly at the center of the upper plate 110. A first central opening 112 is formed in the center of the upper end of the first bushing accommodation portion 111. A strut fastening tool passes through the first central opening 112 for mounting the strut 50 to the top mount assembly 100. Since the first central opening 112 is formed in the upper plate 110, impact transferred from the rubber bushing 130 may be dispersed in a circumferential direction CD of the first central opening 112. Further, the upper plate 110 may be reduced in weight by a space corresponding to the first central opening 112.

Accordingly, it is possible to reduce the weight of the top mount assembly 100. An amount of used raw material may be reduced by an amount corresponding to the first central opening 112 when manufacturing the upper plate 110, which makes it is possible to reduce the manufacturing cost of the top mount assembly 100. The upper plate 110 may be manufactured by pressing or punching a metal plate. A plurality of first bolt coupling holes 113 are formed in the periphery of the first bushing accommodation portion 111. The plurality of first bolt coupling holes 113 may be arranged at regular intervals along the circumferential direction CD of the first bushing accommodation portion 111. For example, the upper plate 110 has a generally triangular planar shape. The plurality of first bolt coupling holes 113 may be disposed adjacent to vertex points of the triangle.

As shown in FIG. 3, the lower plate 120 has a second bushing accommodation portion 121 that protrudes downward at the center of the lower plate 120. The lower plate 120 may be manufactured by pressing or punching a metal plate. The lower plate 120 is disposed below the upper plate 110. A second central opening 122 is formed in the center of a lower end of the lower plate 120. A strut bolt 51, which is provided at the top of the strut 50, passes through the second central opening 122. Since the second central opening 122 is formed in the lower plate 120, the impact transferred from the strut 50 may be dispersed in the circumferential direction CD of the second central opening 122. In addition, the lower plate 120 may be reduced in weight by a space corresponding to the second central opening 122, which makes it is possible to reduce the weight of the top mount assembly 100. An amount of used raw material may be reduced by an amount corresponding to the second central opening 122 when manufacturing the lower plate 120, which makes it is possible to reduce the manufacturing cost of the top mount assembly 100. A plurality of second bolt coupling holes 123 are formed in the periphery of the second bushing accommodation portion 121. The plurality of second bolt coupling holes 123 may be arranged at regular intervals along the circumferential direction CD of the second bushing accommodation portion 121. For example, the lower plate 120 may have a generally triangular planar shape which corresponds to the planar shape of the upper plate 110. In this case, the plurality of second bolt coupling holes 123 may be disposed adjacent to vertex points of the triangle.

As shown in FIG. 3, in one embodiment, the lower plate 120 may comprise a plurality of first holding portions 124 formed to be arranged at regular intervals along the circumferential direction CD of the second bushing accommodation portion 121. The first holding portion 124 may have a first protrusion 124a formed to protrude downward from the lower plate 120 toward the lower housing 150. The first protrusion 124a may be formed by punching or pressing the lower plate 120 from the upper side toward the lower side. A first opening 124b is formed in a lower end of the first protrusion 124a. The first protrusion 124a may have a cup shape that decreases in diameter as it goes from the lower plate 120 to the first opening 124b.

Figure 4:
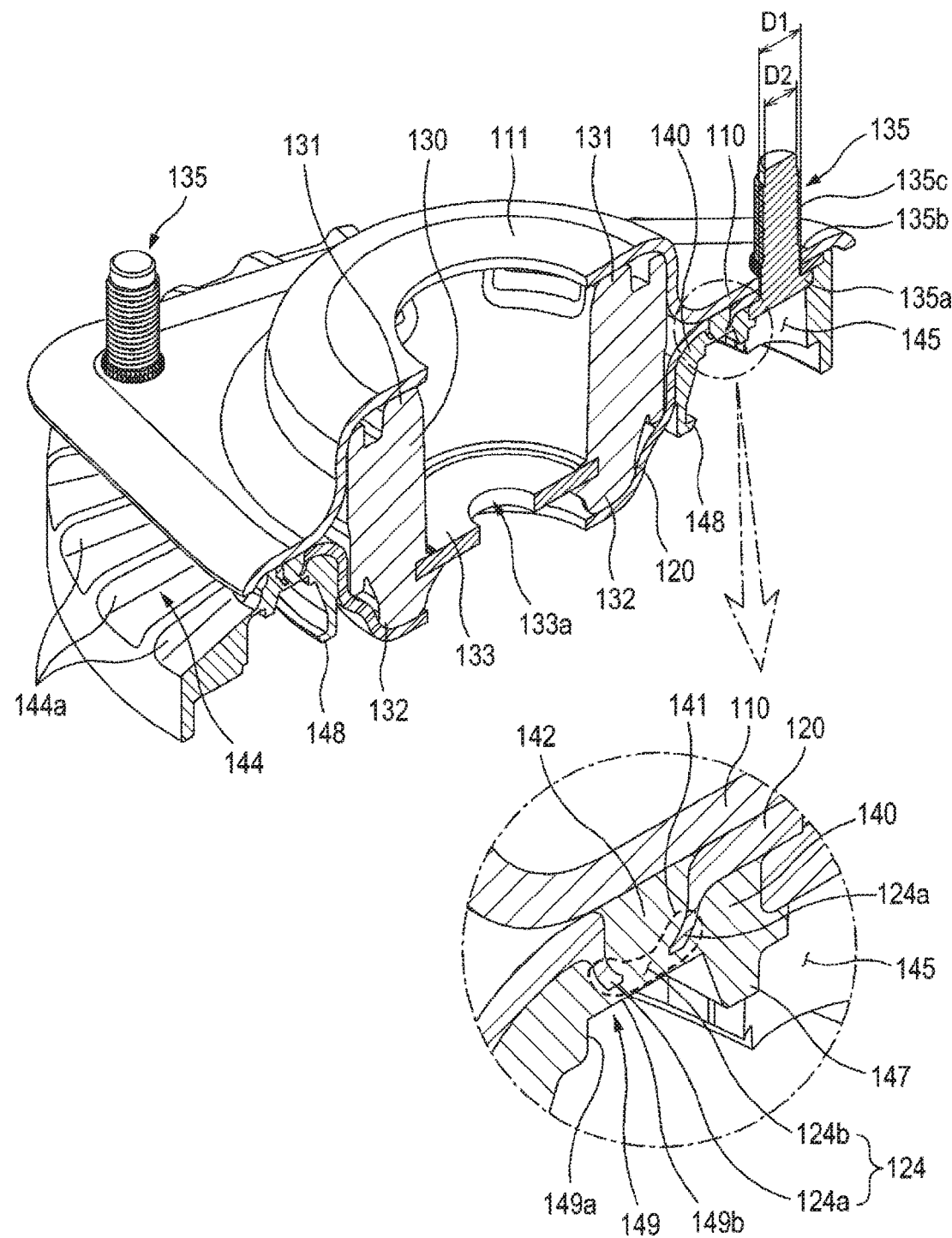
FIG. 4 is a cross-sectional perspective view illustrating the insulator and the upper housing shown in FIG. 2.

The rubber bushing 130 is accommodated in an accommodation space defined by the first bushing accommodation portion 111 and the second bushing accommodation portion 121 when the upper plate 110 and the lower plate 120 are coupled. The rubber bushing 130 is disposed between the upper plate 110 and the lower plate 120 to absorb the impact transferred from the strut 50. The rubber bushing 130 may have a hollow cylindrical shape. As shown in FIGS. 3 and 4, a plurality of first projections 131 are formed in an upper end of the rubber bushing 130 to be arranged in a spaced-apart relationship with each other along the circumferential direction CD. Accordingly, even if the impact from the strut 50 is applied to the plurality of first projections 131, the first projections 131 are expanded or deformed into a space spaced along the circumferential direction CD. Thus, the impact transferred from the strut 50 may be effectively absorbed by the rubber bushing 130. A plurality of second projections 132 are also formed in a lower end of the rubber bushing 130. The second projection 132 may have the same shape and function as the first projection 131, and thus a detailed description thereof will be omitted.

FIG. 4 is a cross-sectional perspective view illustrating the insulator and the upper housing shown in FIG. 2.

A core member 133 is provided inside the rubber bushing 130. The core member 133 is made of a metal plate and has a disc shape in which an opening 133a is formed in the center. The core member 133 is disposed adjacent to the second projections 132 of the rubber bushing 130. By minimizing the size of the rubber bushing 130 interposed between the core member 133 and the strut 50, the strut 50 can be stably supported by the top mount assembly 100. The strut bolt 51 provided on an upper end of the strut 50 is coupled with the strut nut 52 on the upper surface of the core member 133 through the opening 133a of the core member 133. The rubber bushing 130 may be manufactured through vulcanization-molding in a state in which the core member 133 is secured to a mold.

The plurality of bolts 135 are coupled to the lower plate 120 and the upper plate 110 so as to protrude upward from the upper plate 110. The plurality of bolts 135 are used to couple the lower plate 120 and the upper plate 110 to each other as well as to mount the top mount assembly 100 to the vehicle body. For example, the top mount assembly 100 may be fixed to the vehicle body by arranging the plurality of bolts 135 to protrude upward of the vehicle body, and fastening the plurality of nuts to the plurality of bolts 135.

In one embodiment, the bolt 135 may comprise a head portion 135a, a fitting portion 135b, and a threaded portion 135c. The head portion 135a is disposed on the lower side of the lower plate 120. The fitting portion 135b is a portion that is press-fitted to the first bolt coupling hole 113 of the upper plate 110 and the second bolt coupling hole 123 of the lower plate 120. In order to increase the coupling force between the fitting portion 135b and the lower plate 120 and between the fitting portion 135b and the upper plate 110, knurling or serration may be formed in the fitting portion 135b. The length of the fitting portion 135b may be formed to be longer than the sum of a thickness of the lower plate 120 and a thickness of the upper plate 110. The threaded portion 135c protrudes upward of the upper plate 110. A diameter D1 of the fitting portion 135b may be formed to be larger than a diameter D2 of the threaded portion 135c. Therefore, in the course of fitting the fitting portion 135b to the lower plate 120 and the upper plate 110, it is possible to prevent the threaded portion 135c from being damaged.

In one embodiment, the plurality of bolts 135 may be press-fitted to the second bolt coupling hole 123 from below the lower plate 120 so as to be coupled to the lower plate 120. In addition, the upper plate 110 may be press-fitted to the fitting portions 135b of the plurality of bolts 135 press-fitted to the lower plate 120. Thus, the upper plate 110 and the lower plate 120 are coupled to each other by the fitting portions 135b of the bolts 135. The plurality of bolts 135 may be coupled to each of the upper plate 110 and the lower plate 120.

The upper housing 140 is integrally coupled to the lower plate 120 and the plurality of bolts 135 below the lower plate 120 by the insert injection molding. Since the upper housing 140, which is a component of the strut bearing, is integrally coupled to the lower plate 120, which is a component of the insulator, it is possible to prevent foreign substances from flowing between the upper housing 140 and the lower plate 120. Thus, it is possible to prevent the upper housing 140 from being separated from the lower plate 120, or prevent the upper housing 140 or the lower plate 120 from being damaged.

In one embodiment, the upper housing 140 may comprise a first coupling portion 141 that covers the first protrusion 124a of the first holding portion 124, and a first filling portion 142 that is filled from the first opening 124b of the first holding portion 124 to the upper surface of the lower plate 120. Since the first coupling portion 141 is formed to surround upper and lower sides, and an end portion of the first protrusion 124a, the contact area between the upper housing 140 and the lower plate 120 can be widened. Therefore, the coupling force between the upper housing 140 and the lower plate 120 can be increased. Further, since the first filling portion 142 is filled from the first opening 124b to the upper surface of the lower plate 120 and is filled into the first protrusion 124a having a cup shape, it is possible to prevent the first filling portion 142 from being separated from the first opening 124b. Thus, it is possible to prevent the upper housing 140 from moving downward or being separated from the lower plate 120.

As shown in FIG. 3, in one embodiment, the upper housing 140 may be integrally coupled to the lower plate 120 and the plurality of bolts 135 by the insert injection molding in the state in which the plurality of bolts 135 are fitted to the lower plate 120. For example, the upper housing 140 may be manufactured by injecting molten plastic that is a material of the upper housing 140 into a mold, in a state that the lower plate 120 to which the plurality of bolts 135 are coupled is fixed to the mold.

In one embodiment, the upper housing 140 may comprise a plate mount portion 143 on which the lower plate 120 is coupled to an upper surface thereof, and a rib portion 144 having a plurality of ribs 144a formed to be arranged around the plate mount portion 143. The plate mount portion 143 is formed to correspond to a shape of a lower surface of the lower plate 120. By forming the rib portion 144 around the plate mount portion 143, it is possible to reduce the contraction or deformation of the upper surface of the upper housing 140 when the molten material of the upper housing 140 is cured in the course of manufacturing the upper housing 140. As a result, the upper housing 140 may have a uniform strength. In one embodiment, the plurality of ribs 144a may be radially arranged about the plate mount portion 143. Thus, when the molten material of the upper housing 140 is cured, the upper surface of the upper housing 140 may be contracted or deformed uniformly along the circumferential direction CD of the plate mount portion 143. As a result, the upper housing 140 may have a uniform strength along the circumferential direction CD of the plate mount portion 143.

Figure 5:
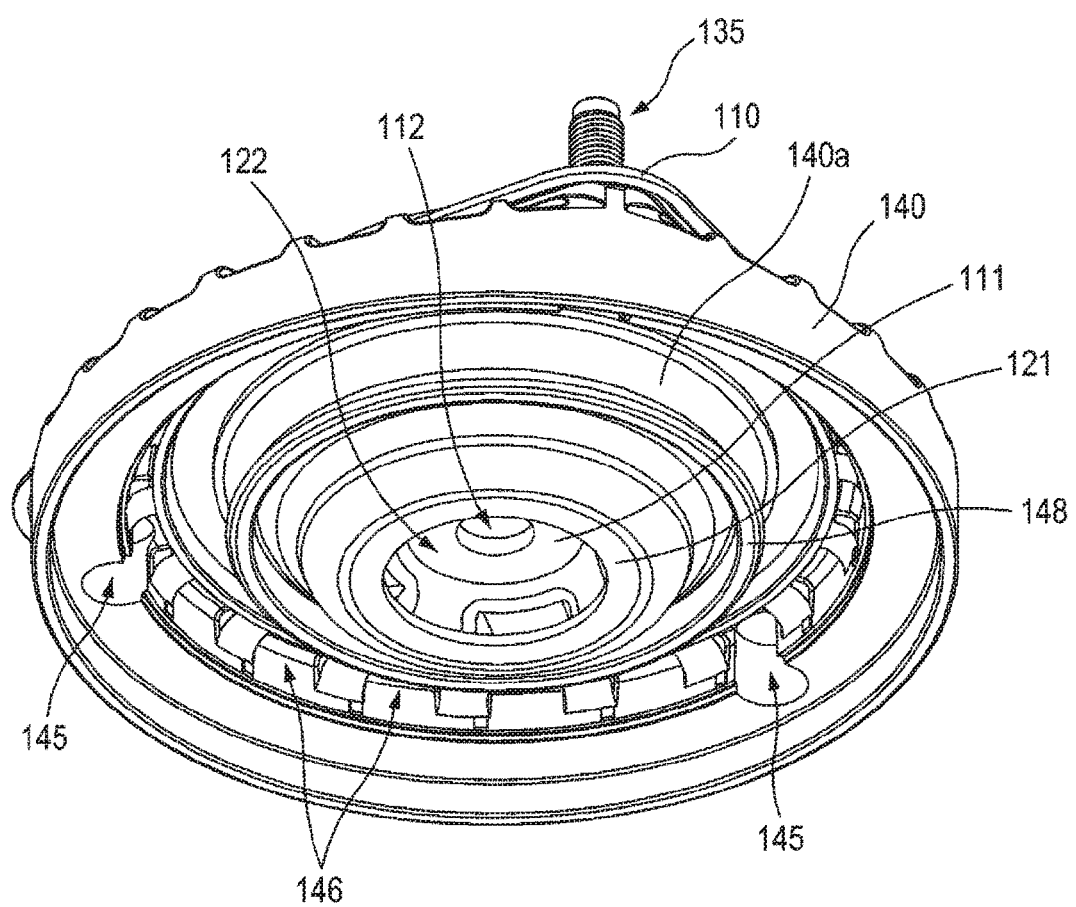
FIG. 5 is a bottom perspective view illustrating the insulator and the upper housing shown in FIG. 2.

FIG. 5 is a bottom perspective view illustrating the insulator and the upper housing shown in FIG. 2.

In one embodiment, a plurality of jig insertion openings 145 into which a jig supporting the head portions 135a of the bolts 135 is inserted, may be formed in a lower side of the upper housing 140. The plurality of jig insertion openings 145 may be arranged at regular intervals in a spaced-apart relationship with each other along the circumferential direction CD. The plurality of jig insertion openings 145 may be arranged in a coaxial relationship with the plurality of bolts 135. After the upper housing 140 is formed in the state in which the plurality of bolts 135 are fitted to the lower plate 120, the jig serves to support the plurality of bolts 135 when the upper plate 110 is fitted to the plurality of bolts 135. When the upper plate 110 is fitted to the plurality of bolts 135, the jig is arranged in a coaxial relationship with the plurality of bolts 135 and the plurality of jig insertion openings 145. Therefore, when the upper plate 110 is fitted to the plurality of bolts 135, the upper housing 140 formed to cover the plurality of bolts 135 can be prevented from being damaged. A diameter D3 (see FIG. 8) of the jig insertion opening 145 may be formed to be smaller than a diameter D4 (see FIG. 8) of the head portion 135a. In this case, a portion of the upper housing 140 is formed to cover a portion of the bottom of the head portion 135a. Thus, the contact area between the upper housing 140 and the plurality of bolts 135 can be widened. Therefore, the coupling force between the upper housing 140 and the plurality of bolts 135 can be increased.

In one embodiment, the lower surface of the upper housing 140 may have a plurality of concave portions 146 formed to be arranged in a spaced-apart relationship along the circumferential direction CD. In this case, the plurality of concave portions 146 may be arranged at regular intervals in a spaced-apart relationship along the circumferential direction CD. Thus, when the molten material of the upper housing 140 is cured, it is possible to suppress the lower surface of the upper housing 140 from being contracted or deformed.

As shown in FIGS. 4 and 5, in one embodiment, the upper housing 140 may have an extended portion 147 that extends downward to be in contact with the upper portion of the bearing 160. The extended portion 147 presses the bearing 160 in a downward direction toward the lower housing 150 in the state in which the upper housing 140 and the lower housing 150 are coupled. Thus, the bearing 160 may be located and supported at a predetermined position between the upper housing 140 and the lower housing 150.

As shown in FIGS. 4 and 5, in one embodiment, the upper housing 140 may comprise an upper hook 148 for coupling the upper housing 140 with the lower housing 150. The upper hook 148 protrudes in a radially outward direction OR from an outer peripheral surface of a cylindrical portion 140a that is formed in an inner peripheral portion of the upper housing 140. The upper hooks 148 are continuously formed along the circumferential direction CD. Alternatively, a plurality of upper hooks may be formed to be spaced apart from each other along the circumferential direction CD.

In one embodiment, the lower surface of the upper housing 140 may have an upwardly concave groove 149. At least a portion of an inner seal member 170 is accommodated in the groove 149. By extending a foreign-substance inflow path between the upper housing 140 and the lower housing 150 in a radially inward direction IR, the sealing property between the upper housing 140 and the lower housing 150 can be improved. The groove 149 has an inner sidewall 149a positioned in the radially inward direction IR and a bottom wall 149b parallel to the lower surface. The inner sidewall 149a may also be understood to as an inner sidewall of the upper housing 140.

Figure 6:
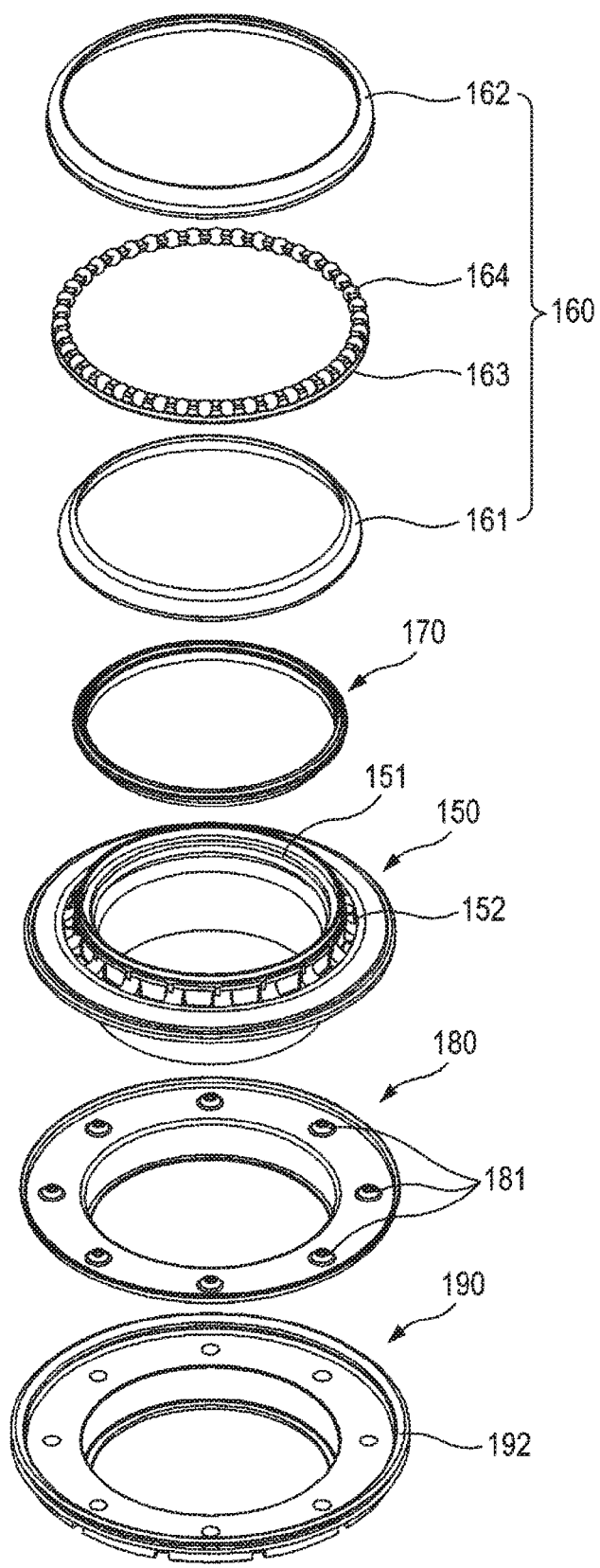
FIG. 6 is an exploded perspective view illustrating a configuration in which a lower housing and a bearing shown in FIG. 2 are disassembled.
Figure 7:
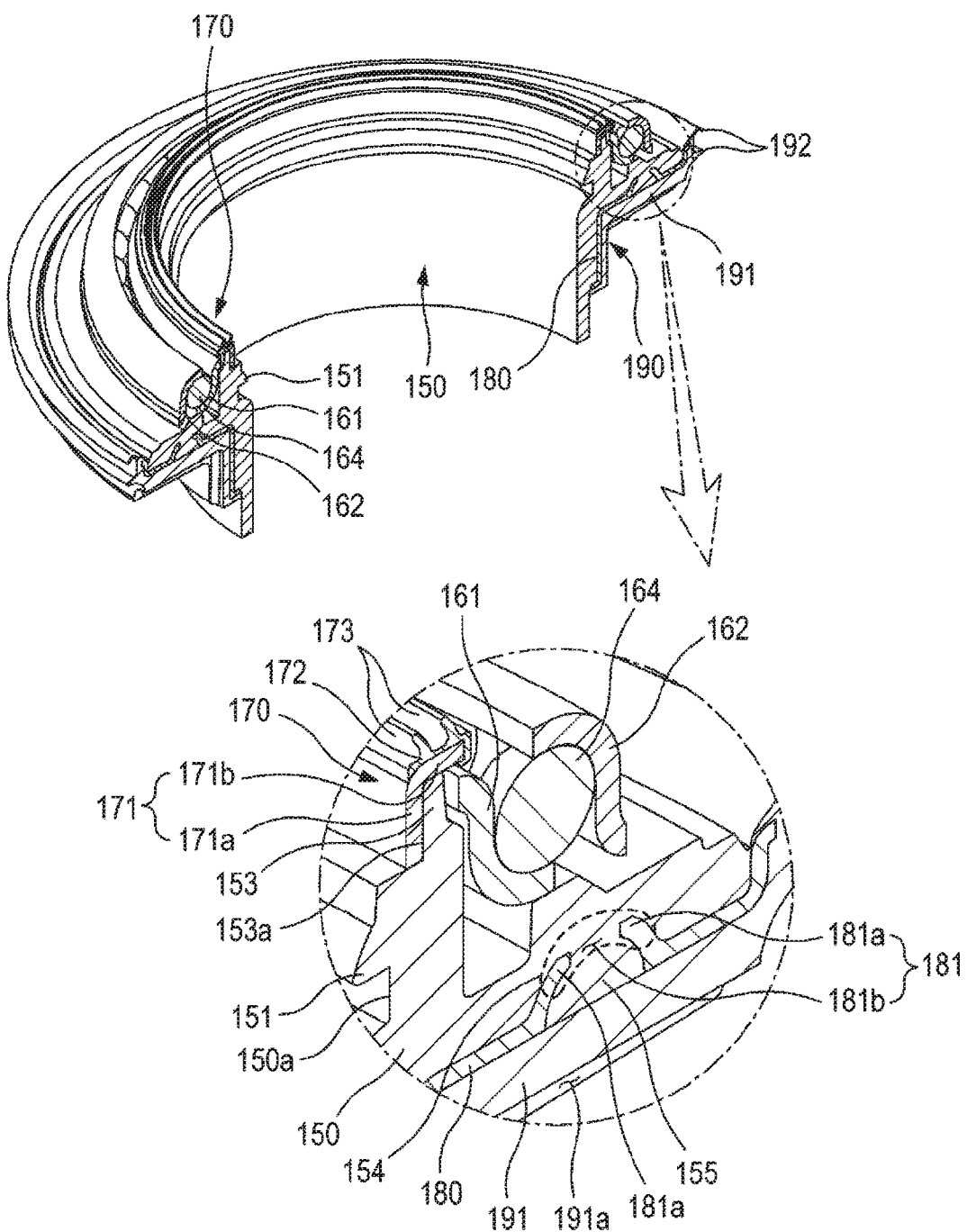
FIG. 7 is a cross-sectional perspective view illustrating a configuration in which the lower housing and the bearing shown in FIG. 2 are coupled.

FIG. 6 is an exploded perspective view illustrating a configuration in which the lower housing and the bearing shown in FIG. 2 are disassembled. FIG. 7 is a cross-sectional perspective view illustrating a configuration in which the lower housing and the bearing shown in FIG. 2 are disassembled.

The lower housing 150 is coupled to the upper housing 140 from below the upper housing 140. As shown in FIGS. 6 and 7, in one embodiment, the lower housing 150 may comprise a lower hook 151 that is coupled to the upper hook 148 of the upper housing 140. The lower hook 151 protrudes in the radially inward direction IR from an inner peripheral surface 150a of the lower housing 150. The lower hook 151 is continuously formed along the circumferential direction CD. Alternatively, a plurality of lower hooks may be formed to be spaced apart from each other along the circumferential direction CD. In one embodiment, the upper housing 140 and the lower housing 150 may be coupled to each other by a snap-fit manner. For example, the upper hook 148 protruding in the radially outward direction OR and the lower hook 151 protruding in the radially inward direction IR may be coupled to each other, so that the upper housing 140 and the lower housing 150 are coupled to each other.

As shown in FIG. 6, in one embodiment, the lower housing 150 may comprise a bearing seat 152 for supporting the bearing 160. The bearing seat 152 extends in the radially outward direction OR from an outer peripheral surface of the lower housing 150.

Figure 8:
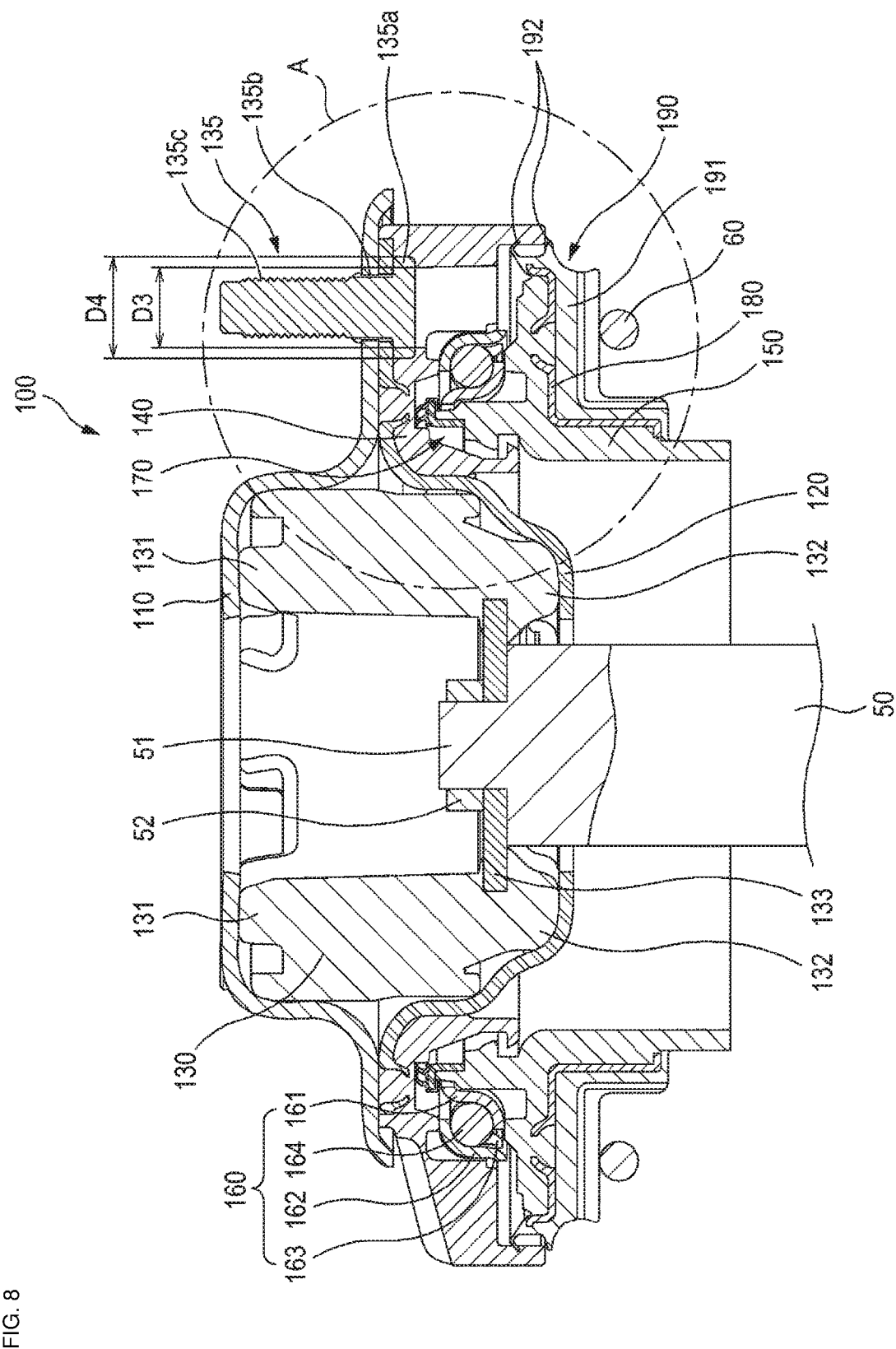
FIG. 8 is a cross-sectional view taken along line X-X shown in FIG. 1.
Figure 9:
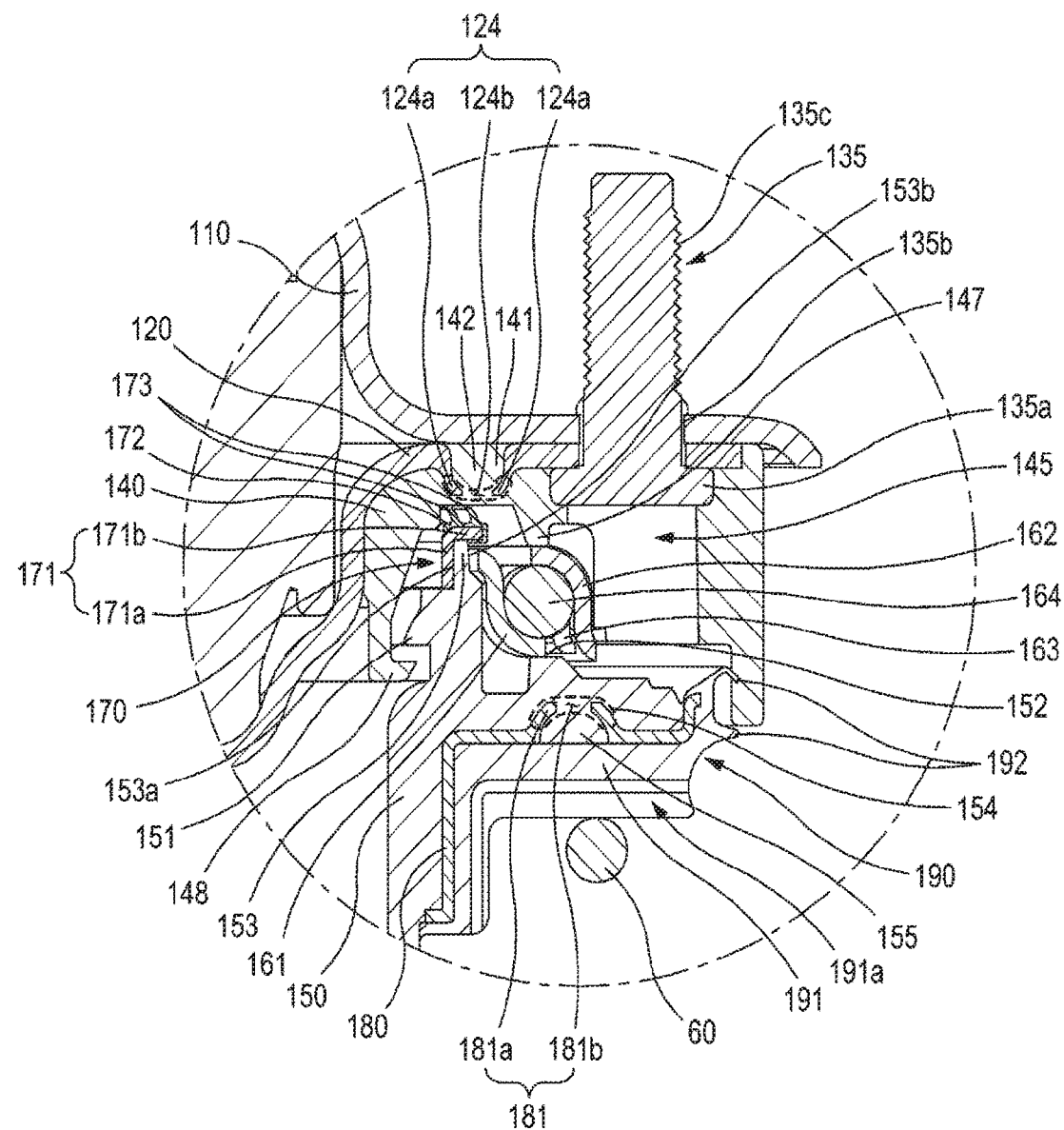
FIG. 9 is an enlarged cross-sectional view of A portion shown in FIG. 8.

FIG. 8 is a cross-sectional view taken along line X-X shown in FIG. 1. FIG. 9 is an enlarged cross-sectional view of A portion shown in FIG. 8.

The bearing 160 is interposed between the upper housing 140 and the lower housing 150 to rotate the lower housing 150 relative to the upper housing 140. In one embodiment, the bearing 160 may comprise an inner ring 161, an outer ring 162, a retainer 163, and a plurality of rolling elements 164. The inner ring 161 is placed on the bearing seat 152. The outer ring 162 is spaced from the inner ring 161 and rotates relative to the inner ring 161. A lower end of the extended portion 147 of the upper housing 140 is placed on an upper end of the outer ring 162. The retainer 163 is supported by the inner ring 161 and the bearing seat 152. The retainer 163 serves to hold the plurality of rolling elements 164 at predetermined intervals. The rolling elements 164 are supported by the retainer 163 and the inner ring 161 and are rotatable within the retainer 163. The rolling elements 164 may be configured by balls or rollers.

In one embodiment, the top mount assembly 100 may further comprise the inner seal member 170. The inner seal member 170 comprises a seal frame 171, a seal base portion 172, and a plurality of inner seal ribs 173.

The seal frame 171 is coupled to an upper end portion 153 of the lower housing 150 in the radially inward direction of the bearing 160. The seal frame 171 may be formed by pressing a metallic plate member or a metallic pipe member. The seal frame 171 comprises a sleeve 171a coupled to the upper end portion 153 of the lower housing 150, and a flange 171b extending in the radially outward direction OR from the upper end of the sleeve 171a. The sleeve 171a has a hollow cylindrical shape. The sleeve 171a may be press-fitted to an inner periphery surface 153a of the upper end portion 153 of the lower housing 150. An outer peripheral surface of the sleeve 171a is brought into contact with the inner peripheral surface 153a of the upper end portion 153, so that the sleeve 171a is coupled to the lower housing 150. As shown in FIGS. 8 and 9, the flange 171b may extend generally vertically from the sleeve 171a in the radially outward direction OR such that a vertical cross-section shape of the seal frame 171 has an L-shape. In one embodiment, in the state in which the seal frame 171 is coupled to the lower housing 150, the flange 171b may protrude in the radially outward direction OR from an outer peripheral surface 153b of the upper end portion 153 of the lower housing 150.

The seal base portion 172 is coupled to the flange 171b of the seal frame 171. The seal base portion 172 may be manufactured by vulcanization-molding rubber material in a state of being coupled to an upper surface of the flange 171b via an adhesive. In one embodiment, the seal base portion 172 may be coupled to the seal frame 171 (i.e., the flange 171b) so as to cover the upper surface of the flange 171b, an outer end of the flange 171b in the radial direction, and a portion or all of the lower surface of the flange 171b. Therefore, an area in which the seal base portion 172 is bonded or coupled to the flange 171b is widened, which makes it is possible to increase the coupling force between the seal base portion 172 and the flange 171b. This makes it is difficult to separate the seal base portion 172 from the flange 171b, thus improving the durability of the inner seal member 170.

The inner seal rib 173 extends upward from the seal base portion 172. As shown in FIG. 9, in one embodiment, an upper end of the inner seal rib 173 may be arranged to be apart in the radially outward direction OR from the inner sidewall 149a of the groove 149 and to be in contact with the bottom wall 149b of the groove 149. Thus, even if the upper housing 140 moves in the radially inward direction IR or the radially outward direction OR relative to the lower housing 150, the upper end of the inner seal rib 173 remains spaced from the inner sidewall 149a of the groove 149 and remains in contact with the bottom wall 149b of the groove 149. Thus, the sealing property between the upper housing 140 and the lower housing 150 is not degraded. In one embodiment, a width of the groove 149 in the radial directions IR and OR may correspond to a width of the seal base portion 172 in the radial directions IR and OR. Accordingly, foreign substances are prevented from flowing into the groove 149, which makes it is possible to further improve the sealing property between the upper housing 140 and the lower housing 150 in the radially inward direction IR.

The plurality of inner seal ribs 173 may be arranged parallel to each other. The inner seal ribs 173 may be arranged obliquely in the radially inward direction IR from the seal base portion 172. The inner seal ribs 173 and the seal base portion 172 may be integrally formed by vulcanization-molding rubber material.

In one embodiment, the top mount assembly 100 may further comprise a spring pad frame 180 that is integrally coupled with the lower housing 150. The spring pad frame 180 is disposed on the outer peripheral surface of the lower housing 150. The spring pad frame 180 reinforces the rigidity of the lower housing 150 and indirectly supports the upper end of the spring 60 disposed below the spring pad frame 180. The spring pad frame 180 may be formed of a metal plate, for example, a hot rolled steel plate. The spring pad frame 180 is integrally coupled with the lower housing 150 by injecting molten plastic while fixing the spring pad frame 180 to a mold when manufacturing the lower housing 150.

As shown in FIG. 6, in one embodiment, the spring pad frame 180 may comprise a plurality of second holding portions 181 arranged at regular intervals along the circumferential direction CD. As shown in FIG. 9, the second holding portion 181 may have a second protrusion 181a protruding upward from the spring pad frame 180 toward the upper housing 140. The second protrusion 181a may be formed by punching or pressing the spring pad frame 180 from the lower side toward the upper side. A second opening 181b is formed on an upper end of the second protrusion 181a. The second protrusion 181a may have a cup shape that decreases in diameter from the spring pad frame 180 to the second opening 181b.

As shown in FIG. 9, the lower housing 150 may comprise a second coupling portion 154 that covers the second protrusion 181a of the second holding portion 181, and a second filling portion 155 that is filled from the second opening 181b of the second holding portion 181 to the lower surface of the spring pad frame 180. Since the second coupling portion 154 is formed so as to cover upper and lower sides and a lower end portion of the second protrusion 181a, the contact area between the lower housing 150 and the spring pad frame 180 can be widened. Therefore, the coupling force between the lower housing 150 and the spring pad frame 180 can be increased. Further, since the second filling portion 155 is filled from the second opening 181b to the lower surface of the spring pad frame 180 and is filled into the cup-shaped second protrusion 181a, it is possible to prevent the second filling portion 155 from being separated upward from the second opening 181b. Thus, it is possible to prevent the lower housing 150 from moving upward or being separated from the spring pad frame 180.

In one embodiment, the top mount assembly 100 may further comprise a spring pad 190 that is integrally coupled with the spring pad frame 180 outside of the spring pad frame 180. At least a portion of the spring pad 190 is disposed between the upper housing 140 and the lower housing 150 in the radially outward direction OR of the bearing 160 to seal between the upper housing 140 and the lower housing 150. For example, the spring pad 190 may be formed of rubber material. In addition, the spring pad 190 may be manufactured by vulcanization-molding rubber material in a state of being coupled to the outer peripheral surface of the spring pad frame 180 through an adhesive.

As shown in FIG. 9, in one embodiment, the spring pad 190 may comprise a seat portion 191 and an outer seal rib 192. The seat portion 191 and the outer seal rib 192 may be manufactured by vulcanization-molding rubber material in a state in which the spring pad 190 is coupled to the outer peripheral surface of the spring pad frame 180. The seat portion 191 extends in the radially outward direction OR. The upper end of the spring 60 is located outside or on an outer peripheral surface of the seat portion 191. The seat portion 191 prevents noise due to friction caused between the lower housing 150 (or the spring pad frame 180) and spring 60, and suppresses impact or vibration from being transferred from the spring 60 to the lower housing 150 (or the spring pad frame 180). The outer seal rib 192 is integrally formed with the seat portion 191 above the seat portion 191 and seals between the upper housing 140 and the lower housing 150 in the radially outward direction OR of the bearing 160. The plurality of outer seal ribs 192 may be formed to bring into contact with the lower portion of the upper housing 140.

Figure 10:
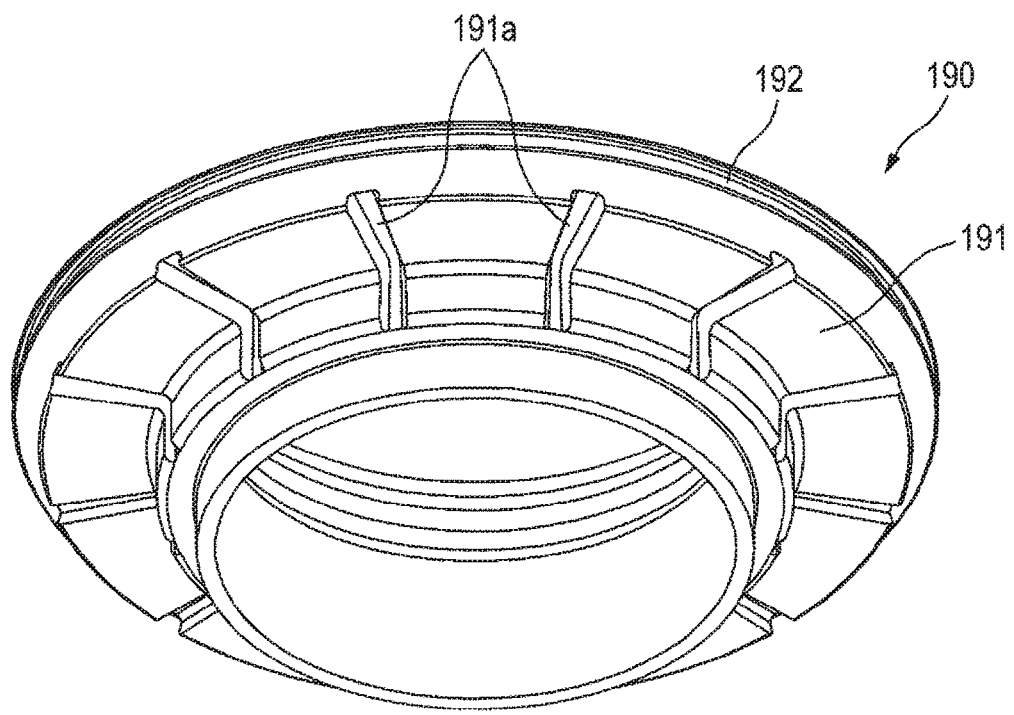
FIG. 10 is a bottom perspective view illustrating the lower housing shown in FIG. 2.

FIG. 10 is a bottom perspective view illustrating the lower housing shown in FIG. 2.

As shown in FIG. 10, in one embodiment, a plurality of slots 191a may be formed in the lower surface of the seat portion 191 to be arranged in a spaced-apart relationship along the circumferential direction CD. Due to the formation of the plurality of slots 191a, even if impact from the spring 60 is applied to the lower surface of the seat portion 191, the lower surface of the seat portion 191 expands or deforms to the plurality of slots 191a along the circumferential direction CD. Thus, the impact transferred from the spring 60 may be efficiently absorbed by the seat portion 191. Further, the spring pad 190 may be reduced in weight by areas corresponding to the plurality of slots 191a, which makes it is possible to reduce the weight of the top mount assembly 100. An amount of used raw material may be reduced by a volume corresponding to the plurality of slots 191a, which makes it is possible to reduce the manufacturing cost of the top mount assembly 100.

Figure 11:
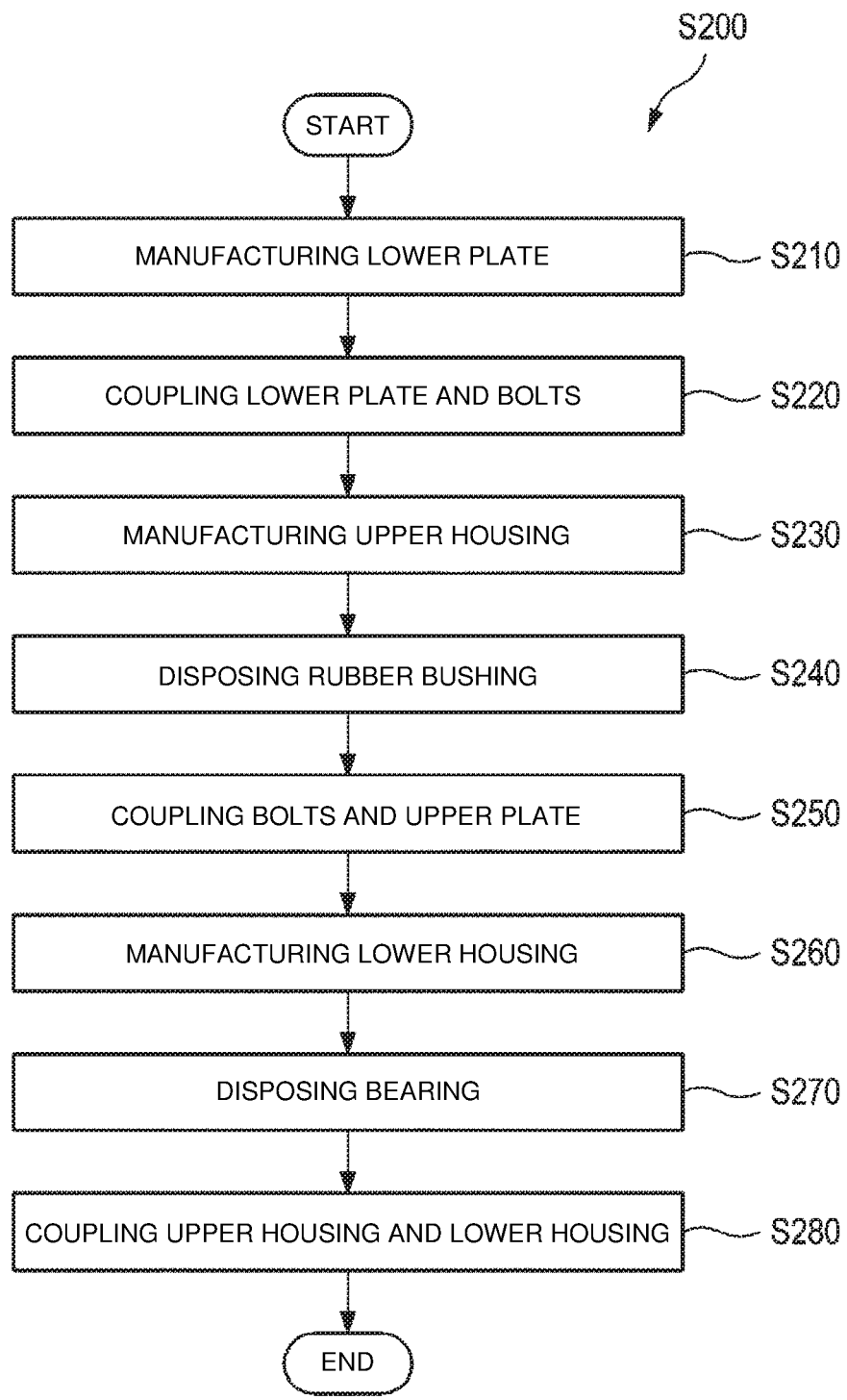
FIG. 11 is a flowchart for explaining a flow of a manufacturing method for a top mount assembly according to one embodiment of the present disclosure.
Figure 12:
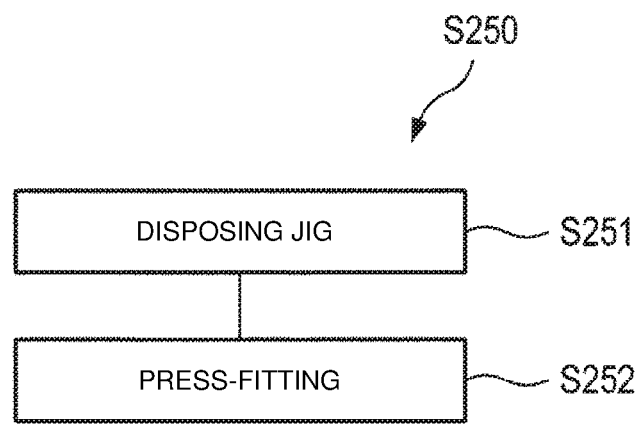
FIG. 12 is a flowchart for explaining a step of coupling bolts and an upper plate shown in FIG. 11.

FIG. 11 is a flowchart for explaining a flow of a top mount assembly manufacturing method according to an embodiment of the present disclosure. FIG. 12 is a flowchart for explaining a step of coupling the bolts and the upper plate in FIG. 11.

Although the process operations, the method operations, the algorithms, and the like have been described in a sequential order in the flowcharts shown in FIGS. 11 and 12, such processes, methods, and algorithms may be configured to operate in any appropriate order. In other words, the operations of the processes, methods, and algorithms described in various embodiments of the present disclosure need not be performed in the order described in this disclosure. Further, although some operations are described as being performed asynchronously, these some operations may be performed simultaneously in some embodiments. In addition, illustration of the process shown in the drawings does not mean that the illustrated process excludes other alternations and modifications thereto, and it does not mean that any one of the illustrated processes or operations is essential to one or more of the various embodiments of the present disclosure and does not mean that the illustrated process is preferred.

As shown in FIG. 11, the top mount assembly manufacturing method S200 according to an embodiment of the present disclosure comprises step S210 of manufacturing the lower plate, step S220 of coupling the lower plate and the bolts, step S230 of manufacturing the upper housing, step S240 of disposing the rubber bushing, step S250 of coupling the bolts and the upper plate, step S260 of manufacturing the lower housing, step S270 of disposing the bearing, and step S280 of coupling the upper housing and the lower housing. The detailed configuration, the function, and the like of the top mount assembly 100 have been described in detail through the embodiment shown in FIGS. 1 to 10, and thus detailed description thereof will be omitted hereinafter.

In step S210 of manufacturing the lower plate, the second bushing accommodation portion 121 is formed in the lower plate 120 to protrude downward at the center of the lower plate 120. In one embodiment, in step S210 of manufacturing the lower plate, the plurality of first holding portions 124 may be formed in the lower plate 120 to be arranged at regular intervals along the circumferential direction CD of the second bushing accommodation portion 121. In step S210 of manufacturing the lower plate, the plurality of first holding portions 124 may be formed by pressing or punching the lower plate 120 made of a metal plate.

In one embodiment, in step S210 of manufacturing the lower plate, the first protrusion 124a may be formed in the first holding portion 124 to protrude downward from the lower plate 120 toward the lower housing 150. The first opening 124b may be formed in the lower end of the first protrusion 124a.

In step S220 of coupling the lower plate and the bolts, the plurality of bolts 135 are coupled to the first bolt coupling holes 113 of the lower plate 120 to protrude upward from the lower plate 120. In one embodiment, in step S220 of coupling the lower plate and the bolts, the plurality of bolts 135 may be press-fitted to the first bolt coupling holes 113 from below the lower plate 120, and may be coupled to the lower plate 120.

In step S230 of manufacturing the upper housing, the upper housing 140 is manufactured by the insert injection molding to be integrally coupled to the lower plate 120 and the bolts 135 below lower plate 120. In one embodiment, in step S230 of manufacturing the upper housing, the upper housing 140 may be configured to comprise the first coupling portion 141 covering the protrusion and the first filling portion 142 filled from the first opening 124b to the upper surface of the upper plate 110.

In step S240 of disposing the rubber bushing, the rubber bushing 130 is disposed in the second bushing accommodation portion 121 of the lower plate 120. In the state in which the lower plate 120 and the upper plate 110 are coupled, the rubber bushing 130 is disposed in the accommodation space defined by the first bushing accommodation portion 111 of the upper plate 110 and the second bushing accommodation portion 121 of the lower plate 120.

In step S250 of coupling the bolts and upper plate, the upper plate 110 is positioned above the lower plate 120 and is coupled to the plurality of bolts 135 to accommodate the rubber bushing 130. In one embodiment, in step S250 of coupling the bolts and the upper plate, the upper plate 110 may be press-fitted from above the lower plate 120 to be coupled with the plurality of bolts 135.

As shown in FIG. 12, in one embodiment, step S250 of coupling the bolts and the upper plate may comprise a jig disposing step S251 and a press-fitting step S252. In the jig disposing step S251, the jig is disposed to support the plurality of bolts 135 from below the upper housing 140. In the press-fitting step S252, the upper plate 110 is press-fitted to the plurality of bolts 135. With this configuration, when the upper plate 110 is fitted to the plurality of bolts 135, it is possible to prevent the upper housing 140, which covers the plurality of bolts 135, from being damaged.

In step S260 of manufacturing the lower housing, the lower housing 150 is manufactured to have a configuration that is capable of being coupled to the upper housing 140.

In step S270 of disposing the bearing, the bearing 160 is disposed on the lower housing 150 (e.g., the bearing seat 152). In the state in which the upper housing 140 and the lower housing 150 are coupled, the bearing 160 is interposed between the extended portion 147 of the upper housing 140 and the bearing seat 152 of the lower housing 150.

In step S280 of coupling the upper housing and the lower housing, the lower housing 150 is coupled to the lower side of the upper housing 140 such that the bearing 160 is interposed between the upper housing 140 and the lower housing 150. For example, the upper housing 140 and the lower housing 150 may be coupled in a snap-fit manner through the upper hook 148 and the lower hook 151.

Although the technical spirit of the present disclosure has been described by way of some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A top mount assembly comprising:
   an upper plate having a first bushing accommodation portion formed to protrude upward at a center portion;

a lower plate disposed below the upper plate and having a second bushing accommodation portion formed to protrude downward at a center portion;

a rubber bushing accommodated in an accommodation space defined by the first bushing accommodation portion and the second bushing accommodation portion when the upper plate and the lower plate are coupled to each other;

a plurality of bolts coupled to the lower plate and the upper plate so as to protrude upward from the upper plate;

an upper housing comprising plastic material and integrally coupled to the lower plate and the plurality of bolts below the lower plate by insert injection molding;

a lower housing coupled to the upper housing from below the upper housing; and a bearing interposed between the upper housing and the lower housing such that the lower housing is rotated relative to the upper housing, wherein the lower plate comprises a plurality of holding portions formed to be arranged at regular intervals along a circumferential direction of the second bushing accommodation portion, and wherein the holding portion has a protrusion formed to protrude downward from the lower plate toward the lower housing, and an opening is formed in a lower end of the protrusion.

2. The top mount assembly of claim 1, wherein the upper housing comprises:
 a coupling portion that covers the protrusion; and
 a filling portion provided to be filled from the opening to an upper surface of the lower plate.

3. The top mount assembly of claim 1, wherein the plurality of bolts are coupled to the lower plate by being press-fitted to the lower plate from below the lower plate, and the upper plate is press-fitted to the plurality of bolts which are press-fitted to the lower plate.

4. The top mount assembly of claim 3, wherein the upper housing is integrally coupled to the lower plate and the plurality of bolts by insert injection molding in a state in which the plurality of bolts are fitted to the lower plate.

5. The top mount assembly of claim 1, wherein the bolt comprises:
 a head portion disposed below the lower plate;
 a fitting portion fitted to the lower plate and the upper plate; and
 a threaded portion protruding upward from the upper plate.

6. The top mount assembly of claim 5, wherein a diameter of the fitting portion is larger than a diameter of the threaded portion.

7. The top mount assembly of claim 5, wherein a plurality of jig insertion openings, into which a jig configured to support the head portion of the bolt is inserted, are formed in a lower portion of the upper housing.

8. The top mount assembly of claim 7, wherein a diameter of the jig insertion openings is smaller than a diameter of the head portion.

9. The top mount assembly of claim 1, wherein the upper housing comprises:
 a plate mount portion having an upper surface to which the lower plate is mounted; and
 a rib portion having a plurality of ribs disposed around the plate mount portion.

10. The top mount assembly of claim 9, wherein the plurality of ribs are radially arranged about the plate mount portion.

11. The top mount assembly of claim 1, wherein a plurality of concave portions, which are arranged to be spaced-apart from each other along a circumferential direction, are formed in a lower surface of the upper housing.

* * * * *